July 16, 1929.  LE ROY HUNTER  1,721,120
DIRIGIBLE LIGHT
Filed March 29, 1928
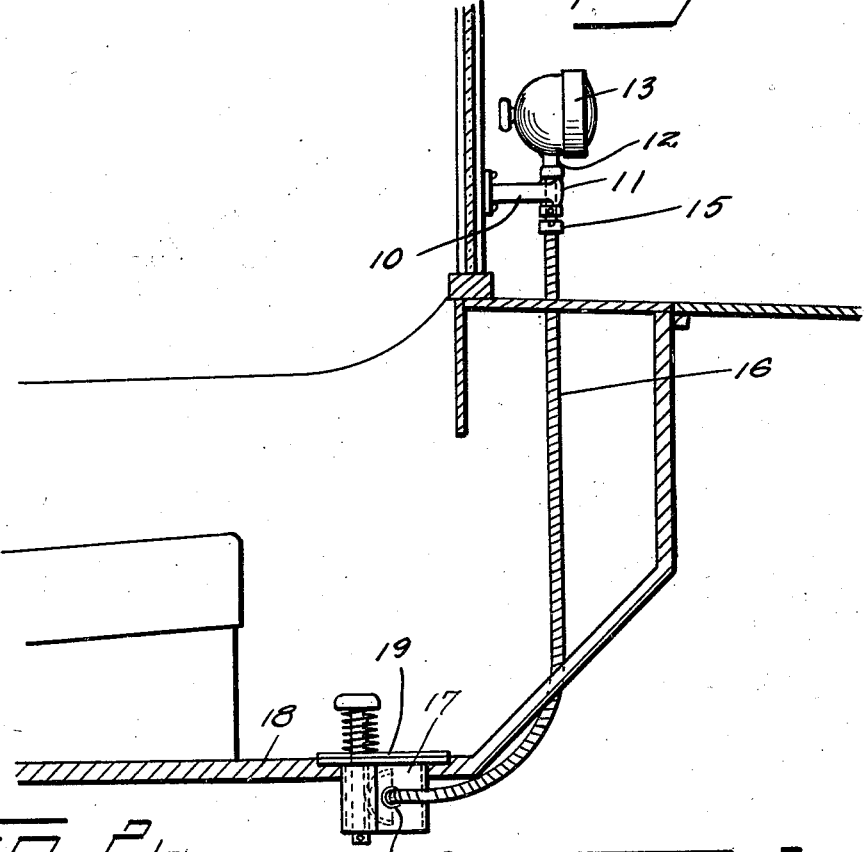
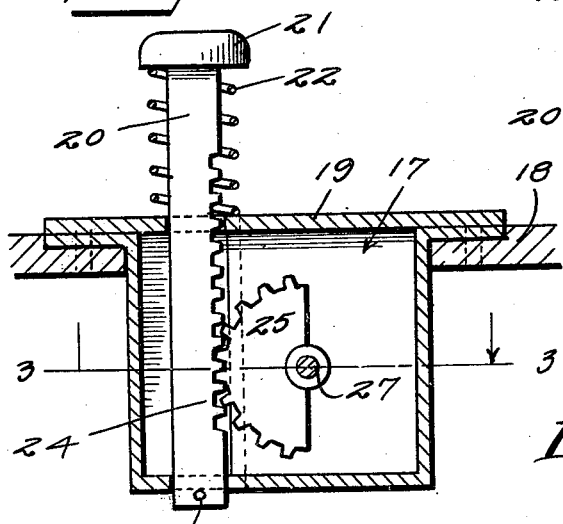
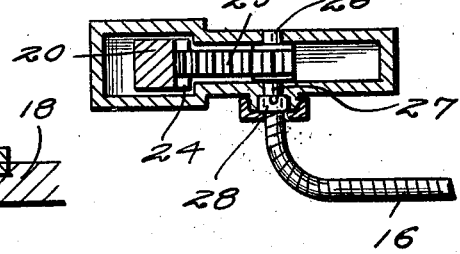
Inventor
*Le Roy Hunter*
By *Watson E. Coleman*

Patented July 16, 1929.

1,721,120

UNITED STATES PATENT OFFICE.

LE ROY HUNTER, OF YAMPA, COLORADO.

DIRIGIBLE LIGHT.

Application filed March 29, 1928. Serial No. 265,732.

This invention relates to dirigible lights.

An important object of the invention is to provide operating mechanism for a horizontally swinging light permitting control of the position of the light without the necessity for the operator of the vehicle removing his hands from the steering wheel.

A further object of the invention is to provide a device of this character which may be very readily and cheaply constructed and installed and which will be durable and efficient in service.

These and other objects I attain by the construction shown in the accompanying drawing, wherein for the purpose of illustration is shown a preferred embodiment of my invention and wherein:—

Figure 1 is a vertical sectional view through a portion of a vehicle having applied thereto a dirigible light constructed in accordance with my invention;

Figure 2 is an enlarged vertical sectional view through the foot operated control member;

Figure 3 is a section on the line 3—3 of Figure 2.

Referring now more particularly to the drawing, the numeral 10 generally designates a bracket arm adapted to be attached to the wall or windshield of the vehicle. This bracket arm has a vertically extending bearing 11 in which is rotatably mounted a shaft 12 of a spotlight 13. The lower end of this shaft is adapted, as at 14, for engagement with a coupling 15 at one end of a flexible shaft 16. The numeral 17 generaly designates a casing adapted to be installed in an opening formed in the floor boards 18 of the vehicle. The upper wall 19 of this casing extends beyond the side walls thereof and rests upon the floor boards at the edges of the opening. Directed through this upper wall and guided between the side walls is a plunger 20, the upper end of which is formed with a head 21 for engagement by the foot. Between the head and the upper wall 19, a spring 22 surrounds the plunger and constantly urges the same upwardly. A pin 23 directed through the lower end of the plunger and engaging the lower end of the casing limits upward movement of the plunger. Within the casing, the plunger is formed as a rack 24 and mounted for oscillation in the casing is a segmental gear 25, which meshes with the rack and has stub hubs 26 and 27 rotatably engaging the walls of the casing. The stub hub 27 exteriorly of the casing is adapted for engagement with the coupling member 28 at the opposite end of the shaft 16.

It will be obvious that the headlight through its connection with the plunger will be normally maintained in one position by the spring 22 and at this position may be altered to suit the desires of the operator by placing pressure on the plunger to depress the same. The light, when at its limit, as defined by the spring, is preferably directed straight ahead in the path of travel of the vehicle and may be swung to the right to illuminate the right hand edge of the road or that edge along which the vehicle is traveling when the vehicle is moving about a turn. Such a control may be conveniently employed under driving conditions where it is desirable that the operator at all times have full control of the steering wheel.

Since the construction hereinbefore set forth is capable of a certain range of change and modification without materially departing from the spirit of the invention, I do not limit myself to such specific structure except as hereinafter claimed.

I claim:—

In a dirigible light for vehicles, a casing mounted in the flooring of the vehicle, a vertical plunger guided thereby, means limiting movement of the plunger in opposite directions, a spring normally holding the plunger elevated, a member rotated by depression of the plunger, said plunger having one face thereof formed as a rack, a segment coacting with the rack and having stub shafts pivoted in the walls of the casing, one of said stub shafts being formed as a clutch, a flexible shaft having at one end a second member of the clutch and engaged with said stub shaft, and a connection between the opposite end of the flexible shaft and the light.

In testimony whereof I hereunto affix my signature.

LE ROY HUNTER.